V. M. OSBORN.
DEVICE FOR PREVENTING HENS FROM SETTING.
APPLICATION FILED DEC. 27, 1910.

1,008,050.

Patented Nov. 7, 1911.

Witnesses:
N. Tiernan
J. T. Kirkham

Inventor:
Vern M. Osborn,
By
Atty

COLUMBIA PLANOGRAPH CO., WASHINGTON, D. C.

UNITED STATES PATENT OFFICE.

VERN M. OSBORN, OF LOS ANGELES, CALIFORNIA.

DEVICE FOR PREVENTING HENS FROM SETTING.

1,008,050. Specification of Letters Patent. Patented Nov. 7, 1911.

Application filed December 27, 1910. Serial No. 599,522.

*To all whom it may concern:*

Be it known that I, VERN M. OSBORN, a citizen of the United States, and a resident of the city and county of Los Angeles, in the State of California, have invented certain new and useful Improvements in Devices for Preventing Hens from Setting, of which the following is a specification.

My invention pertains to devices for preventing hens from setting, and it comprises a frame adapted to be attached to the body of the hen, and from which two legs project downwardly so that the hen is thereby prevented from resting the forward part of its body on the ground or on the nest.

It is well known in poultry breeding that during the period of incubation the breast of the fowl becomes unduly heated, producing a desire to remain on the nest, or "set," as it is technically known.

The object, therefore, is to provide a means whereby the fowl will be prevented from sitting on the nest in such a manner that its breast will be in contact with the nest or the eggs therein, as will now be set forth in detail.

Figure 1:
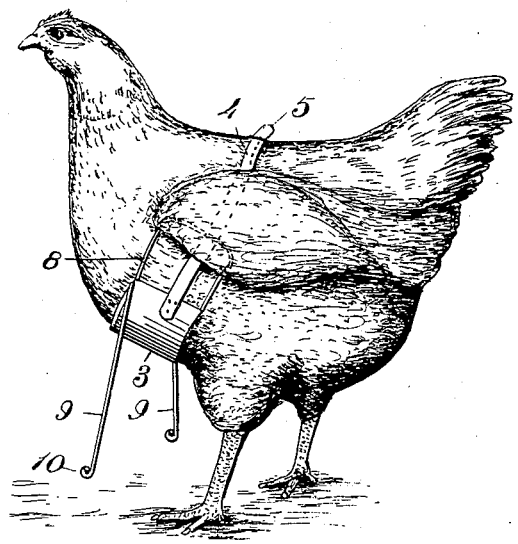
Figure 2:
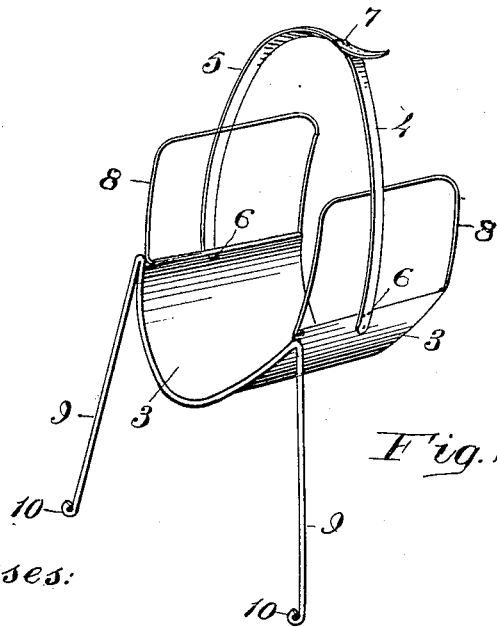

In the drawings, Figure 1 is a perspective view of the device as applied to a fowl, and Fig. 2 is a perspective view of the device.

In constructing my invention I provide a short trough-like structure 3, made preferably of thin sheet metal, so that it may be readily bent or formed into shape, and this is adapted to be placed against the breast of the fowl, and this is herein termed the breast plate.

A pair of straps 4, 5, have their ends riveted to the side edges of the breast plate, midway between its ends, as at 6, one of the straps having a buckle 7, and by means of which the breast plate may be secured to the body of the fowl. These straps pass around the body behind and beneath the wings, as shown.

In order to prevent the breast plate from swinging around the body and thus being displaced, each upper edge of the plate has an upwardly-projecting loop 8, formed of wire, which are designed to extend up beneath the wings and rest against the wing joints. The wire for this purpose should be of such a character that it may be readily bent or formed into such shape or position as to properly adapt it for the fowl, and to prevent an undue binding or pressure against any portion of the body.

At the forward end of the breast plate is a pair of downwardly-projecting legs 9. As shown in this instance the legs are made of wire, formed of one piece, the middle portion thereof having a downwardly shaped loop to conform with the shape of the plate, and secured thereto in any convenient manner. The terminals of the legs have looped ends, as at 10, and the length of these legs is such that they will clear the ground when the fowl is erect, or when feeding. In practice the legs are disposed in such a manner that when the fowl attempts to sit on the nest the legs 9 touch the ground, or the nest, and the body of the fowl will then be tilted back, and thus prevent the breast from touching the eggs, and the result is that in a very short time the fever abates and the incubation period passes without any injury to the fowl.

The use of the device does not require segregation, and the fowls thus equipped can run and feed with others in the brood, and thereby prevent much care and annoyance, besides greatly shortening the period of incubation.

What I claim as new, is:

1. In apparatus of the character described, a breast plate adapted to be secured to a fowl, a pair of legs projecting downwardly therefrom, a loop on each side projecting upwardly from the breast plate and resting under the wing joints, to prevent the breast plate from being laterally displaced on the fowl.

2. In apparatus of the character described, a breast plate shaped to fit around the breast of a fowl, a pair of legs projecting downwardly therefrom, a pair of loops projecting upwardly from the breast plate, and straps attached to the upper edges of said plate midway between the ends of the plate, and adapted to be secured around the body of the fowl at a point behind the wing joints.

3. In apparatus of the character described, a breast plate shaped to fit around the breast of a fowl, a pair of legs projecting downwardly therefrom, straps attached to the upper edges of said plate and adapted to be secured around the body, and a loop extending upwardly from each side edge of the plate and adapted to rest beneath the wing joints.

4. In apparatus of the character described, a breast plate shaped to fit the breast of a fowl, a pair of legs at the forward end of the plate rigidly secured thereto and projecting downwardly therefrom, a pliable loop extending upwardly from each side edge of the plate, and a pair of straps fixed to the plate and adapted to be adjustably attached to the fowl.

Signed at the city of Los Angeles, State of California, this 15th day of December, 1910, in the presence of witnesses.

VERN M. OSBORN.

Witnesses:
EARL NEWMIRE,
V. J. MONTELEONE.

Copies of this patent may be obtained for five cents each, by addressing the "Commissioner of Patents, Washington, D. C."